Patented Oct. 19, 1954

2,692,253

UNITED STATES PATENT OFFICE 2,692,253

AMIDE-ESTER POLYMERS

Reynold E. Holmen, White Bear Township, Ramsey County, Minn., assignor to Minnesota Mining & Manufacturing Company, St. Paul, Minn., a corporation of Delaware No Drawing. Application June 19, 1952,
Serial No. 294,474

4 Claims. (Cl. 260—67)

This invention relates to synthetic polymeric or resinous bodies containing both ester linkages and amido linkages, to methods of making such polymers, and to products prepared therefrom. The invention has particular reference to amide-ester polymers which are soluble in readily available organic solvents and form concentrated solutions of low viscosity suitable for impregnation of saturating-paper and the like, and which can be readily cured to an insoluble, tough and rubbery state.

One particular application for which these polymers are well suited is the impregnation and unification of paper backings for pressure-sensitive adhesive masking tapes. For this purpose it is desirable to employ concentrated solutions, so that an adequate amount of material is deposited in the paper base in a single treatment. The solution must be sufficiently fluid to penetrate and impregnate the saturating-paper, and should not string out or form "cob-webs" when the saturated paper is passed between rollers for controlling the coating weight. The polymer must adhere strongly to the cellulosic or other fibers of the web so as to bond them together and unify the sheet. The polymer must be film-forming, and the film should be solvent-resistant in order to prevent attack and penetration by solvents, plasticizers and color components of paints and lacquers. Hence the polymer should be susceptible of curing from the soluble to the solvent-resistant state after incorporation in the web.

These and other advantageous properties are obtained, in accordance with the present invention, by reacting together substantially equimolar proportions of components consisting essentially of terephthalic or isophthalic acid, and a combination of polyglycols and amino alcohols reactive therewith and so selected and proportioned as to provide an average of about 3–12, or preferably 4–9, ether linkages, and also one amido group having a single hydrogen atom attached to the nitrogen atom, for approximately each 25–90 atoms, or preferably 35–65 atoms, in the skeletal polymer chain, as will now be more fully set forth by means of specific but non-limitative examples.

Example 1

|  | Parts by weight | Mols |
|---|---|---|
| Terephthalic acid | 41.5 | 2.5 |
| Polyethylene glycol | 60 | 3.0 |
| Monoethanolamine | 6.2 | 1.0 |

Sodium bisulfate in the amount of 0.1 part by weight was added as a catalyst. Other esterification catalysts, e. g. sulfuric acid, may be substituted. The catalyst may be added at the start of the heating process, or, preferably, after the reaction has proceeded somewhat. Such catalysts reduce the time needed to complete the reaction, but are not essential and may be omitted.

The mixture was placed in a still fitted with a condenser, and heated for 4½ hours at 165° C. and 7½ hours at 165–258° C. The system was then evacuated and heating continued for 8 hours at 210–234° C. and 3 mm. of pressure, and 3 hours at 265° C. and 3 mm. During the heating under vacuum, there was recovered approximately one-half of the initial amount of polyethylene glycol. The acid number of the polymeric product was 1.7. The product was soluble in mixtures of isopropanol and xylol, forming a smooth, fluid solution at concentrations of the order of 60%.

To the polymer solution there was added a quantity of a soluble, heat-reactive melamine-formaldehyde resin ("Melmac 248–8") to the extent of 4% by weight of the weight of the dry polymer. This solution was spread in a thin film on an amalgamated tin panel, dried, and cured by heating for 4 hours at 100 C. The film was stripped from the panel and tested for tensile strength and elongation, using a Scott Inclined Plane Serigraph testing instrument and operating at normal room temperature and under conditions such that 10% elongation was obtained in from one to 4 seconds. The modulus of the film at 100% elongation was 40 lbs./sq. in. and the tensile strength at break was 102 lbs./sq. in at 655% elongation.

Saturating-paper was impregnated with the above mixture of polymer and melamine-formaldehyde curing agent. After drying and curing, the treated paper was found to be highly resistant to solvent penetration, and served as a flexible backing for pressure-sensitive masking tape.

The polyethylene glycol had an average molecular weight of approximately 200, and was a commercially available mixture of polyethylene glycols. It was added in substantial excess in order to dissolve the terephthalic acid and provide a homogeneous system for reaction, the excess being subsequently removed by vacuum distillation.

Example 2

Isophthalic acid in equal amount was substituted for the terephthalic acid in Example 1, and the reaction carried forward substantially as there described. (Mixtures of isophthalic and terephthalic acids in any proportion are equally useful.) The resulting polymer was substantially identical in properties with that of Example 1. It cured to a rubbery film when heated with about 2–6% of melamine-formaldehyde resin as described under Example 1. In both examples, the rate of cure could be increased by the addition of small amounts of acidic catalysts such as oxalic acid.

*Example 3*

|                      | Parts by weight |
|----------------------|-----------------|
| Terephthalic acid    | 41.5            |
| Polyethylene glycol  | 60              |
| Monoethanolamine     | 3.1             |

As in Example 1, the reactants were heated in the presence of 0.1 part of sodium bisulfate, the conditions being 25 hours at 185–195° C., 7 hours at 198° C., and 25 hours at 230–255° C. and 2–4 mm. pressure. The excess of polyethylene glycol was distilled off during the heating under vacuum. The product when cured by heating with a small amount of melamine-formaldehyde curing agent gave a weakly elastic film.

The proportion of monoalkanolamine in Example 3 will be seen to be only one-half as great as the proportion employed in Examples 1 and 2. The amount used provides an average of one reactive hydrogen atom—i. e. one amide linkage—for approximately each 90 atoms in the skeletal chain of the polymer, and represents an approximate lower limit of frequency where the resulting polymer is required to be curable to an elastic, solvent-resistant film. At frequencies greater than about one amide linkage per 25 atoms in the skeletal chain, polymers are obtained which are undesirably stiff and inelastic for many purposes.

Polymerization may be carried out in the presence of a water-immiscible volatile liquid such as xylol, water of condensation being removed during the reaction.

The polyethylene glycol of an average molecular weight of about 200 is preferred, but other glycols having greater or lesser molecular weight may be substituted in whole or in part, provided they have an average of at least two ether linkages in the molecule. The use of an initial excess of this material provides an effective means of placing the difficultly soluble acidic component in solution, and also reduces the reaction time necessary to provide a product having a low acid number. However, any such excess must obviously be of a material sufficiently low in molecular weight as to permit its subsequent removal under ester interchange and vacuum distillation.

The monoethanolamine provides a primary amino group which, when reacted with a carboxyl radical, forms in the polymer chain an amido group having a reactive hydrogen atom and providing a point of reactivity with an active methylol group of the melamine-formaldehyde resin. Non-cyclizable primary amino monoalkanolamines in general may be substituted for the monoethanolamine within the limitations as to the required frequency of amide linkages along the polymeric skeleton, with the limitation that the nitrogen atom must be attached to a non-tertiary—i. e. primary or secondary—carbon atom. Included within the class of useful monoalkanolamines are n-propanolamine, iso-propanolamine, n-butanolamine, n-decanolamine, 2-amino-1-pentanol, 3-amino-4-heptanol, 2-amino-4-pentanol.

Minor amounts of other difunctional reactants such as diamines, N-substituted alkanolamines, unsaturated dicarboxylic acids, etc. may be introduced as modifiers provided they do not substantially alter the average frequency of the reactive hydrogen atoms along the polymer chain.

Methylol-containing melamine-formaldehyde resins have been found to impart a high degree of strength to these amide-ester polymers when used in small amounts of the order of 2–6% as curing agents. Other amino-aldehyde resins as well as phenol-aldehyde resins containing free methylol groups, as well as aldehydes such as formaldehyde and glyoxal, are likewise effective as curing agents for these polymers. The cured polymer is highly solvent-resistant, tough and rubbery. When cured by heating in contact with cellulosic and other analogous surfaces to which initially adhered, the product retains its strong bond to such surfaces.

What is claimed is as follows:

1. An amide-ester polymer soluble in isopropanol-xylol and curable to a solvent-resistant, rubbery state by heating with small proportions of aldehydic curing agents, said polymer being obtained by reacting together, at a high temperature, substantially equimolar proportions of components comprising essentially (a) dicarboxylic acids from the class consisting of terephthalic and isophthalic acid, and (b) combinations of a plurality of polyglycols having an average of at least two ether linkages and at least one non-cyclizable primary amino monoalkanolamine having a non-tertiary carbon atom attached to the nitrogen atom; the polyglycols and monoalkanolamines being so selected and proportioned as to provide an average of about 3–12 ether linkages, and one amido group having a single hydrogen atom attached to the nitrogen atom, for approximately each 25–90 atoms in the skeletal polymer chain.

2. An amide-ester polymer soluble in isopropanol-xylol and curable to a solvent-resistant, rubbery state by heating with small proportions of aldehydic curing agents, said polymer being obtained by reacting together, at a high temperature, substantially equimolar proportions of components comprising essentially (a) dicarboxylic acids from the class consisting of terephthalic and isophthalic acid, and (b) combinations of a plurality of polyglycols having an average of at least two ether linkages and at least one non-cyclizable primary amino monoalkanolamine having a non-tertiary carbon atom attached to the nitrogen atom; the polyglycols and monoalkanolamines being so selected and proportioned as to provide an average of about 4–9 ether linkages, and one amido group having a single hydrogen atom attached to the nitrogen atom, for approximately each 35–65 atoms in the skeletal polymer chain.

3. A rubbery, solvent-resistant polymeric product produced by heating together a soluble amide-ester polymer as defined in claim 1 and a small proportion of an aldehydic curing agent.

4. A rubbery, solvent-resistant polymeric product produced by heating together a soluble amide-ester polymer as defined in claim 2 and a small proportion of an aldehydic curing agent.

References Cited in the file of this patent

UNITED STATES PATENTS

| Number    | Name         | Date          |
|-----------|--------------|---------------|
| 2,132,442 | Rothrock     | Oct. 11, 1938 |
| 2,333,639 | Christ et al.| Nov. 9, 1943  |
| 2,341,735 | Monsaroff    | Feb. 15, 1944 |